US007712081B2

(12) United States Patent
Biberstein et al.

(10) Patent No.: US 7,712,081 B2
(45) Date of Patent: May 4, 2010

(54) USING CODE MOTION AND WRITE AND READ DELAYS TO INCREASE THE PROBABILITY OF BUG DETECTION IN CONCURRENT SYSTEMS

(75) Inventors: Marina Biberstein, Kiryat Motzkin (IL); Eitan Farchi, Pardes Hanna-Carcur (IL); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 1344 days.

(21) Appl. No.: 11/038,507

(22) Filed: Jan. 19, 2005

(65) Prior Publication Data

US 2006/0161897 A1    Jul. 20, 2006

(51) Int. Cl.
*G06F 9/44* (2006.01)
(52) U.S. Cl. ..................................... 717/124
(58) Field of Classification Search .............. 717/124, 717/135, 130
See application file for complete search history.

(56) References Cited

U.S. PATENT DOCUMENTS

| | | | | |
|---|---|---|---|---|
| 5,655,096 A * | 8/1997 | Branigin | ................ | 712/200 |
| 5,740,393 A * | 4/1998 | Vidwans et al. | ............ | 712/215 |
| 5,748,937 A * | 5/1998 | Abramson et al. | .......... | 712/218 |
| 5,848,287 A * | 12/1998 | Tran et al. | ................ | 712/23 |
| 5,862,385 A * | 1/1999 | Iitsuka | ................ | 717/156 |
| 5,996,060 A * | 11/1999 | Mendelson et al. | ......... | 712/205 |
| 6,112,019 A * | 8/2000 | Chamdani et al. | ........... | 712/214 |
| 6,275,980 B1 * | 8/2001 | Uchihira et al. | ............ | 717/124 |
| 6,317,816 B1 * | 11/2001 | Loen | ................ | 711/171 |
| 6,442,751 B1 * | 8/2002 | Cocchi et al. | ............... | 717/133 |
| 6,907,547 B2 * | 6/2005 | Shaw et al. | ................ | 714/38 |
| 6,993,747 B1 * | 1/2006 | Friedman | ................ | 717/124 |
| 7,010,787 B2 * | 3/2006 | Sakai | ................ | 717/159 |
| 7,036,106 B1 * | 4/2006 | Wang et al. | ................ | 716/18 |
| 7,167,870 B2 * | 1/2007 | Avvari et al. | ................ | 707/102 |
| 7,299,382 B2 * | 11/2007 | Jorapur | ................ | 714/38 |
| 7,310,798 B1 * | 12/2007 | Gunara et al. | ................ | 717/135 |
| 2002/0162091 A1 * | 10/2002 | Crocker | ................ | 717/126 |
| 2003/0033510 A1 * | 2/2003 | Dice | ................ | 712/235 |
| 2006/0129992 A1 * | 6/2006 | Oberholtzer et al. | ........ | 717/124 |

OTHER PUBLICATIONS

Edelstein et al. "Multithreaded Java program test generation", 2002, IBM Systems Journal vol. 41, No. 1, pp. 111-125.*
Ernst et al. "Cyclone: A Broadcast-Free Dynamic Instruction scheduler with selective Replay", Jun. 2003, ACM, 10 pages.*
Leupers "Instruction Scheduling for Clustered VLIW Architectures", Oct. 2000, PACT 2000, IEEE, 10 pages.*

(Continued)

*Primary Examiner*—Anna Deng

(57) ABSTRACT

A tool is provided for modifying the code of a multi-threaded computer program undergoing testing. The program executes in an environment that has a governing memory model. It is assumed that there is a global heap and a thread-local heap, which are synchronized from time to time. The modifications are of two types: (1) code instructions are reordered while remaining in compliance with the memory model; and (2) thread-local variables are added to functions, together with inserted heap synchronizing instructions. The modified programs are then used by a test generator to prepare test cases for execution. The modifications have the effect of changing the interleavings that occur among different threads, and increase the likelihood of exposing flaws that may become evident under different memory models.

15 Claims, 1 Drawing Sheet

OTHER PUBLICATIONS

Beaty "Genetic Algorithms and Instruction Scheduling", 1991, ACM, pp. 206-211.*

O. Edelstein, E. Farchi, Y. Nir, G. Ratsaby, and S. Ur., Multithreaded Java Program Test Generation, IBM Systems Journal, 41(1):111-125, 2002.

S. D. Stoller, Model-checking Multi-threaded Distributed Java Programs, in Proceedings of the 7th International SPIN Workshop on Model Checking of Software, pp. 224-244, New York, 2000.

James Gosling, Bill Joy, Guy Steele., Addison We-sley, The Java Language Specification, 1996 Sec. 12.6.1.1 (pp. 328-329); chap 17 (pp. 553-584).

JSR-133: Java Memory Model and Thread Spec-ification, available at "http://jcp.org/aboutJava/communityprocess/final/jsr133/index.html".

* cited by examiner

USING CODE MOTION AND WRITE AND READ DELAYS TO INCREASE THE PROBABILITY OF BUG DETECTION IN CONCURRENT SYSTEMS

BACKGROUND OF THE INVENTION

1. Field of the Invention

This invention relates to testing computer software. More particularly, this invention relates to testing software, which runs concurrently as multiple processes or threads, or on distributed processors.

2. Description of the Related Art

The main problem in testing a concurrent computer program, which executes as a plurality of threads or operates on a plurality of distributed platforms, is nondeterminism: two executions of such a program may yield different results. Most of the work in the field of concurrent testing has been focused on detecting race conditions. However, race conditions have a low probability of manifesting themselves, and even when they do, it is not always an indication of a fault. In any case, identifying race conditions is insufficient. It is possible that a program without races contains concurrent bugs, e.g., bugs due to incorrect usage of message-based synchronization.

Another approach to testing software is disclosed in the documents O. Edelstein, E. Farchi, Y. Nir, G. Ratsaby, and S. Ur., *Multithreaded Java Program Test Generation*, IBM *Systems Journal*, 41(1):111-125, 2002, and S. D. Stoller, *Model-checking Multi-threaded Distributed Java Programs*, in *Proceedings of the 7th International SPIN Workshop on Model Checking of Software*, pages 224-244, New York, 2000, Springer Verlag, which are herein incorporated by reference. The problem of generating different interleavings for the purpose of revealing concurrent faults was approached by seeding the program with conditional sleep statements at shared memory access and synchronization events. At run time, random, biased random, or coverage-based decisions were taken as to whether to execute seeded primitives. However, neither race detection nor the seeding approach helps detect bugs related to multi-layer memory models if the tests are executed on one-layer memory implementations.

Furthermore, the space of possible temporal orders of instruction executions by different threads that may be scheduled by a runtime environment, known as interleavings, is an exponential function of the program size. In the typical testing environment, little coverage of the space of possible interleaving is achieved. The term "coverage" concerns checking and showing that testing has been thorough. Coverage is any metric of completeness with respect to a test selection criterion for the program-under-test. The definition of coverage events is usually specific to a program-under-test, and constitutes a major part in the definition of the testing plan of the program.

The problem of testing multi-threaded programs is further compounded by the fact that tests that reveal a concurrent fault in the field or during stress testing are usually long and run under variable environmental conditions. For example, on a given machine, tasks launched asynchronously by the operating system may alter the machine's environment sufficiently to affect the results of two different executions of the same multi-threaded program. As a result, such tests are not necessarily repeatable. When a fault is detected, much effort must be invested in recreating the conditions under which it occurred.

In particular, the semantics of different versions of the Java™ two-layer memory model are a constant source of programmer misunderstandings and concurrent bugs. The Java memory model is described in the document, *The Java Language Specification*, James Gosling, Bill Joy, Guy Steele., Addison Wesley, 1996, and more recently in the document, *JSR*-133: *Java Memory Model and Thread Specification*, available on the Internet.

The memory model addresses the issue of heap synchronization. For various reasons, such as promoting efficient usage of multiprocessor machines, Java defines a two-layer model of the heap. Each thread operates on its own version of the heap, which in turn communicates with a global upper heap layer. The memory model defines the rules for this communication: when a thread executes certain operations, the executing environment must write the global heap onto the local one or vice versa. Another issue addressed by the memory model is instruction reordering. Many compiler optimizations are dependent on the ability of the compiler to reorder or duplicate instructions, issue prefetching requests, etc. However, a seemingly innocuous permutation at the thread level may change the program behavior because of interaction with other threads. Again, it is the responsibility of the memory model to define which permutations are allowed and which are not. The standard proposed in the above-noted JSR-133 model permits different kinds of heap synchronization and instruction reordering rules than its predecessor. Thus, programs that worked correctly under the old Java memory model may malfunction when run under JSR-133.

It is anticipated that the problems outlined above will become even more acute as new computer chips are equipped with two or more processors, and runtime implementations make use of the two-layer memory model.

SUMMARY OF THE INVENTION

According to a disclosed embodiment of the invention, a tool is provided for modifying the code of a multi-threaded computer program undergoing testing. The program executes in an environment that has a governing memory model. It is assumed that there is a global heap and a thread-local heap, which are synchronized from time to time. The code modifications are typically class modifications and are of two types: (1) reordered code instructions that remain in compliance with the memory model; and (2) addition of thread-local variables to functions, together with insertion of synchronizing instructions that force synchronization of the global and thread-local heaps at selected points in the functions. The modified programs are then executed for testing purposes. These modifications have the effect of changing the interleavings that occur among different threads, and increase the likelihood of exposing program flaws that may become evident under different memory models.

The invention provides a method of testing a concurrently operating original computer program that operates under a memory model, which is carried out by reordering a plurality of instructions of the program while remaining in compliance with the memory model to define a modified program, and generating tests using the modified program for execution in order to verify correct operation of the original computer program.

In one aspect of the method, reordering is done by exchanging two of the instructions.

In another aspect of the method, the program has classes, and reordering includes modifying one of the classes.

According to one aspect of the method, the memory model is a one-layer memory model.

According to another aspect of the method, the memory model is a two-layer memory model.

The invention provides a computer software product, including a computer-readable medium in which first computer program instructions are stored, which instructions, when read by a computer, cause the computer to perform a method for testing a concurrently operating second computer program that operates under a memory model, which is carried out by reordering a plurality of instructions of the second computer program while remaining in compliance with the memory model to define a modified second computer program, and generating tests using the modified second computer program for execution in order to verify correct operation of the original second computer program.

The invention provides a system for testing a concurrently operating original computer program that operates under a memory model, including a test generator operative to reorder a plurality of instructions of the program, while remaining in compliance with the memory model to define a modified program. The test generator is adapted to prepare a suite of tests using the modified program, and an execution engine for executing the tests in order to verify correct operation of the original computer program.

The invention provides a method of testing a concurrently operating original computer program that operates as a plurality of threads under a memory model that includes a global heap and a thread-local heap, which is carried out by adding a first variable to a function of the program. The first variable is thread-local, and is stored in the thread-local heap. The first variable corresponds to a second variable that is stored in the global heap. The method is further carried out by inserting synchronizing instructions at selected points in the function for synchronizing the global heap and the thread-local heap so as to equate a value of the first variable and a value of the second variable. The method is further carried out by preparing a suite of tests for execution using a modified program that includes the first variable and the synchronizing instructions in order to verify correct operation of the original computer program.

The invention provides a computer software product, including a computer-readable medium in which computer program instructions are stored, which instructions, when read by a computer, cause the computer to perform a method of testing a concurrently operating second computer program that operates as a plurality of threads under a memory model that includes a global heap and a thread-local heap, which is carried out by adding a first variable to a function of the second computer program. The first variable is thread-local, is stored in the thread-local heap, and corresponds to a second variable that is stored in the global heap. The method is further carried out by inserting synchronizing instructions at selected points in the function for synchronizing the global heap and the thread-local heap so as to equate a value of the first variable and a value of the second variable. The method is further carried out by preparing a suite of tests for execution using a modified second computer program that includes the first variable and the synchronizing instructions in order to verify correct operation of the original second computer program.

The invention provides a system for testing a concurrently operating original computer program that operates as a plurality of threads under a memory model that includes a global heap and a thread-local heap, including a test generator operative to add a first variable to a function of the program, the first variable being thread-local, and being stored in the thread-local heap. The first variable corresponds to a second variable that is stored in the global heap. The test generator is operative at selected points in the function to insert synchronizing instructions for synchronizing the global heap and the thread-local heap so as to equate a value of the first variable and a value of the second variable, and to prepare a suite of tests using a modified program that includes the first variable and the synchronizing instructions. The system includes an execution engine for executing the tests in order to verify correct operation of the original computer program.

The invention provides a method of testing a concurrently operating original computer program that operates as a plurality of threads under a memory model that includes a global heap and a thread-local heap, which is carried out by adding a first variable to a function of the original computer program, the first variable being thread-local and stored in the thread-local heap. The first variable corresponds to a second variable that is stored in the global heap. The method is further carried out by substituting a reference to the first variable for a reference to the second variable in the function, inserting a synchronizing instruction in the function that is subsequent to the reference to the first variable so as to equate the first variable and the second variable, and preparing tests for execution using a modified program that includes the first variable and the synchronizing instruction in order to verify correct operation of the original computer program.

The invention provides a computer software product, including a computer-readable medium in which first computer program instructions are stored, which instructions, when read by a computer, cause the computer to perform a method for testing a concurrently operating second computer program that operates as a plurality of threads under a memory model that includes a global heap and a thread-local heap, which is carried out by adding a first variable to a function of the second computer program, the first variable being thread-local and stored in the thread-local heap. The first variable corresponds to a second variable that is stored in the global heap. The method is further carried out by substituting a reference to the first variable for a reference to the second variable in the function, inserting a synchronizing instruction in the function that is subsequent to the reference to the first variable so as to equate the first variable and the second variable, and preparing tests for execution using a modified program that includes the first variable and the synchronizing instruction in order to verify correct operation of the second computer program.

The invention provides a system for testing a concurrently operating original computer program that operates as a plurality of threads under a memory model that includes a global heap and a thread-local heap, including a test generator operative to produce a modified program by adding a first variable to a function of the original computer program. The first variable is thread-local and is stored in the thread-local heap. The first variable corresponds to a second variable that is stored in the global heap. The test generator is operative for substituting a reference to the first variable for a reference to the second variable in the function, and inserting a synchronizing instruction in the function that is subsequent to the reference to the first variable so as to equate a value of the first variable and a value of the second variable, and preparing tests using the modified program.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage media such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

The embodiments herein are disclosed in part with reference to particular memory models, for example variants of the above-noted Java memory mode. However, the invention is not limited to such examples, and may be practiced with many different memory models.

System Overview.

Figure 1:
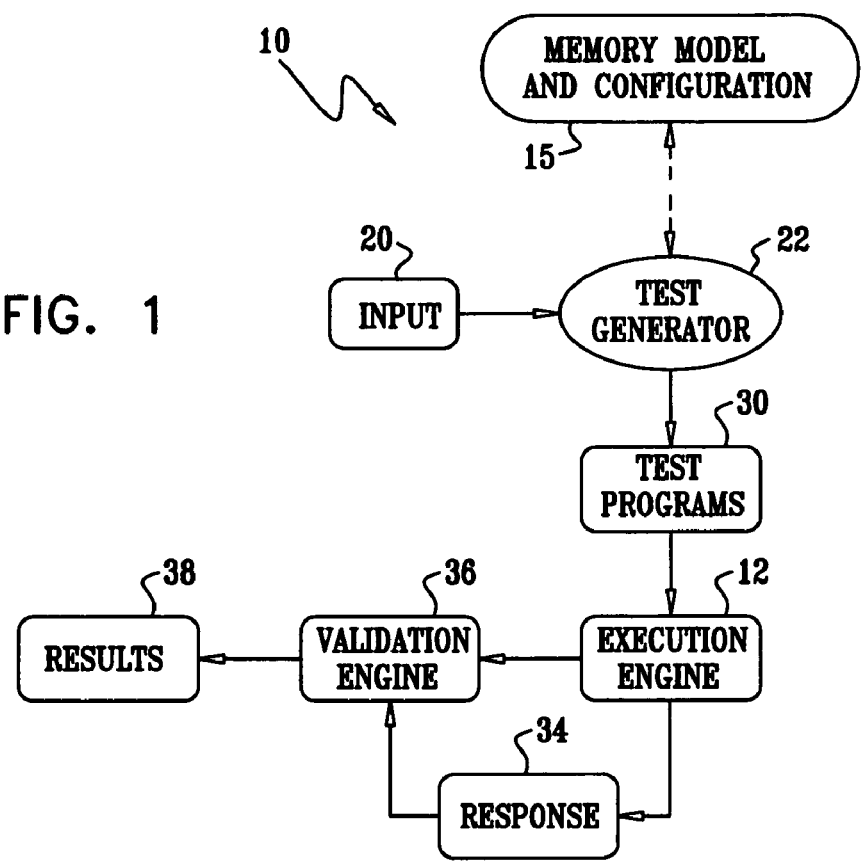
FIG. 1 is a block diagram of a testing system for concurrent computer programs that is operative in accordance with a disclosed embodiment of the invention.

Turning now to the drawings, reference is initially made to FIG. 1, which is a block diagram of a testing system for concurrent or distributed computer programs that is operative in accordance with a disclosed embodiment of the invention. A generic testing system 10, used for testing concurrent software, such as multithreaded software, has several basic interacting components. The system 10 is merely exemplary; the principles of the invention can be applied to many different testing systems.

The testing system 10 enables the creation of tests that have various degrees of randomness. The testing system 10 typically contains provisions for introducing random modifications or provisions for randomization of the tests or biasing them toward conditions of interest, for example bug patterns as described in the document *Concurrent Bug Patterns and How to Test Them*, Eitan Farchi et al., in Proceedings IPDPS 2003:286, which is herein incorporated by reference.

Testing knowledge is stored in the system 10. This includes a memory model, which can be a one-layer or two-layer memory model, or an even more complex memory model. This information may be stored in a database 15, and may include testing constraints, coverage criteria, bug patterns, and configuration information for a generic test generator engine 22.

The test generator engine 22 has a user input 20, which influences the test generator engine 22. The influence of the input 20 includes, for example, biasing hints. The test generator engine 22 can be modified using techniques known to those skilled in the art in order to generate reordered code in accordance with the principles of the invention, as explained in further detail hereinbelow. In some applications, the test generator engine 22 may be realized as a plug-in. Alternatively, it can be a standalone tool. The tool described in the above-noted document, *Multithreaded Java Program Test Generation*, is suitable for the test generator engine 22.

The test generator engine 22 may receive some generic knowledge of the program specification, and can exploit this knowledge so as to generate sequences of instructions to form a suite of tests 30 for execution. The tests can be modifications of the program code or its running environment. Typically, the tests 30 include listings of multiple threads or processes that are executed concurrently by an execution engine 12 on an implementation of a system suitable for the program under test, and which have biased or randomly selected interleavings. The system can be a hardware system, a complex software implemented system, or a hardware simulator. Indeed, the computer program being tested may itself be a simulation program.

Execution of the tests 30 produces a response 34 from the system. The response 34 is submitted to a validation engine 36, which has knowledge of the expected response, validates the response 34, and produces validation results 38. The validation engine 36 may analyze the coverage of the tests 30. Typically, individual tests may be re-executed several times, in order to produce different interleavings.

As the space of possible interleavings of a multithreaded system is exponential, it is necessary to bias interleaving generation based on testing knowledge. Prior attempts have focused on biasing interleaving generation based on bug patterns, anomalies, and coverage criterion. The present invention focuses on problems relating to the governing memory model. By creating tests that are likely to expose concurrent program flaws that relate to the memory model, it is possible to produce legal interleavings that could not be realized heretofore.

As explained above, the governing memory model specifies the way in which compiler optimizations can reorder code and how the runtime environment must manage data transfer from the global heap. A compiler uses this information to generate faster, more efficient programs. The same information is exploited according to the invention for the purposes of test generation. The approach is as follows: before the program execution, and additionally or alternatively at class load time, and additionally or alternatively at points during the program execution, the class code is changed by a testing tool, which itself can be a computer program. The code can thus be modified substantially with or without human intervention. The modified code continues to meet requirements of the memory model, but some operations are reordered. Additionally or alternatively, data transfers to and from the heap are modified so as to create the effect of delay.

In the case of Java, the above-mentioned modifications can be performed by a tool that is not part of the Java virtual machine (JVM), but plugs into the JVM. This can be accomplished, using the Java Platform Profiling Architecture, as described in the document *JSR*-163, available on the Internet.

Alternatively, the Java just-in-time compiler (JIT), which is a part of the JVM, can be used. The output of the tool modifies the code that is executed by the execution engine 12 and the tests that are produced by the test generator engine 22.

Code Transformations and Reordering.

The tool that is used according to the present invention introduces changes in the code of methods defined by a class, either statically (before execution), during class loading or reloading, or during class compilation or recompilation. Reloading or recompilation may be caused by the normal functioning of the JVM or by the tool itself. Specifically, the tool performs both code motion transformations and transformations that have the effect of delaying heap transfers. Such transformations must obey the restrictions imposed by the memory model; subject to this, they can be selected or based on coverage or heuristic considerations.

For example, according to the memory model described in the document *The Java™ Virtual Machine Specification Second Edition*, Lindholm, Tim, and Yellin Frank, available on the Internet, which is herein incorporated by reference:

(1) Within a thread, all events appear to be totally ordered.
(2) For every heap variable, all events accessing the variable appear to be totally ordered.
(3) For every lock, all events accessing this lock appear to be totally ordered.
(4) At each synchronized block entry, variable values from the global heap are read into the thread-local heap.
(5) At each synchronized block exit, variable values from the thread-local heap are written into the global heap.

To facilitate an understanding of code reordering, consider the example of Listing 1.

| Listing 1 |
| --- |
| /* A, B are heap variables initialized to 0.<br>* r1, r2 are thread-local (e.g., stack-allocated)<br>* variables<br>*/<br>    T1:                  T2:<br>    r1 = A              r2 = B<br>    B = 1               A = 2<br>    print r1           print r2 |

The possible outputs of this program if the instruction order is preserved are the pairs 0 0, 0 1, 1 0, 0 2, 2 0, but not the pairs 1 2 or 2 1. However, the memory model allows one to swap the order of the first two instructions in the thread T1. The first rule of the memory model is not violated since this change is transparent for all the events in the thread T1. The resulting code is shown in Listing 2.

| Listing 2 |
| --- |
| /* A, B are heap variables initialized to 0.<br>* r1, r2 are thread-local (e.g., stack-allocated)<br>* variables<br>*/<br>    T1:                  T2:<br>    B = 1              r2 = B<br>    r1 = A              A = 2<br>    print r1           print r2 |

One of the possible interleavings for this code is shown in Listing 3.

| Listing 3 | |
| --- | --- |
| B = 1 | //T1 |
| r2 = B | //T2 |
| A = 2 | //T2 |
| r1 = A | //T1 |
| Print r1 | //T1 |
| Print r2 | //T2 |

Thus, the possible outputs now include the pairs 1 2 and 2 1. Without recourse to the memory model, it would not be possible to produce this test using known techniques.

Figure 2:
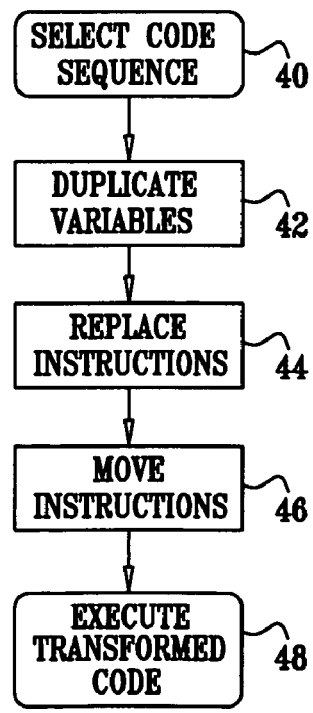
FIG. 2 is a flow chart illustrating a method of functional testing of a multithreaded computer program by code reordering in accordance with a disclosed embodiment of the invention.

Reference is now made to FIG. 2, which is a flow chart illustrating a method of functional testing of a multi-threaded computer program by code reordering in accordance with a disclosed embodiment of the invention. At initial step 40, a method or code sequence within a program under test is selected for code reordering and transformations. It is assumed that a memory model is in force, which limits the reordering possibilities.

Next, at step 42 all or some of the shared variables accessed within the method or code sequence that was selected at initial step 40 are duplicated, for example, by the means of thread-local variables or new local variables. Initialization and manipulation of these duplicate variables depends on the rules laid down by the memory model. For example, in the current versions of the Java two-layer model, at least the transformations shown in the following steps are possible.

Next, at step 44 instructions are replaced. For example, if x is a non-volatile variable, an instruction of the form t=x, where t is local, can be replaced with lcl_x=x; t=lcl_x, where lcl_x is a local or thread-local variable.

Next, at step 46, the first instruction of the pair that was replaced in step 44 can be moved to an earlier stage of the program, but not earlier than the nearest point where variable values from the global heap are read into the thread-local heap according to the memory model or x is read by a different instruction.

Similar transformations for step 44 and step 46 are possible when reading non-volatile fields. If x is a non-volatile variable, or un is a non-volatile field, an instruction of the form x=t or p.x=t, where t is local, can be replaced with lcl_x=t; x=lcl_x or p.x=lcl_x, where lcl_x is a local or thread-local variable. The last instruction of the pair can be moved to a later stage of the program but not later than the nearest point where variable values from the thread-local heap are written onto the global heap according to the memory model or x or p.x is written by a different instruction.

Instruction reordering as described above is performed using one of the well-known instruction scheduling algorithms under the restrictions imposed by the memory model. The reordering algorithm may do rescheduling randomly, pseudorandomly, or may be guided by pattern-based heuristics. For example, relevant techniques include swapping instruction order, speculatively promoting instructions or demoting instructions.

Control now proceeds to final step 48. The method or code sequence as transformed may now be executed. Method execution is likely to result in a different interleaving than would be seen without the rearrangement.

EXAMPLE

There is a well-known bug pattern related to two-layer memory model, namely, the double-checked locking bug, an example of which is given in Listing 4.

Listing 4

```
class Foo{
    public int x;
    public Foo(int _x){x=_x;}
}
class Bar{
    private static Foo foo = null;
    public static void printFoo( ){
        if (foo == null) {
            synchronized(this){
                if (foo == null) {foo = new Foo(17);}
            }//synchronized
        }
        System.out.println(foo.x);
    }
}
```

The problem arises if the thread performs the first test for nullity, which is non-synchronized, and finds that the variable foo is non-null. In this case, the synchronized block is never entered. If the code executes on a JVM with a one-layer memory implementation, the method printFoo( ) will always print 17. However, on a machine with two-layer memory, the following scenario is possible:

Thread T1 executes Bar.printFoo( ), initializing Bar.foo (and Bar.foo.x). Note that at the exit from the synchronized blocks the updated variable values are copied from T1's copy of the heap to the global heap Thread T2 executes Bar.printFoo( ). Upon the method entry, T2's local version of the heap has the updated value of Bar.foo, but not Bar.foo.x. Therefore, the synchronized section is not entered, the global heap is not copied fully to T2's heap, and the method prints out 0.

The conventional techniques noted above cannot reproduce this bug on a JVM with a one-layer memory implementation. The tool according to the invention, however, could store the values of the accessed variables, and modify the code as shown in Listing 5:

Listing 5

```
class Foo{
    public int x;
    public Foo(int _x){x=_x;}
}
class Bar{
    private static Foo foo = null;
    public static void printFoo( ){
        int lcl_x;
        if (foo == null) {
            lcl_x = 0;
            synchronized(this){
                if (foo == null) {
                    foo = new Foo(17);
                    lcl_x = foo.x;
                }
```

Listing 5

```
        }//synchronized
    }else{
        lcl_x = foo.x;
    }
    System.out.println(lcl_x);
}
}
```

The system would first replace, as described above, the direct access to foo.x (println(foo.x)) with a two-staged access: lcl_x=foo.x; println(lcl_x). Then the former instruction is promoted. It is replicated in the process, since the basic block where it is originally defined has several predecessors.

Now, a test execution engine could print out the value 0 on a JVM with a one-layer memory implementation. Use of data transfer delay, with or without code reordering, has the effect of varying the interval between the assignment of a shared variable by a first thread and its use by a second thread. Indeed, elaboration of the technique will occur to those skilled in the art, for example by assignments of a shared variable by different threads, and access of the variable by still other threads at different times. The technique thus permits many different interleavings to be evaluated by a testing system.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of testing a concurrently operating computer program, the method comprising the steps of:
providing an original computer program for execution as a plurality of threads under a memory model that includes a global heap having a global variable, said threads comprising respective thread instructions, thread-local heaps, said thread-local heaps having thread-local heap variables;
duplicating said global variable as a duplicated thread-local heap variable of said thread-local heap of one of said threads;
modifying said thread instructions of said one thread to define a modified thread such that an execution of said modified thread instructions manipulates said duplicated thread-local heap variable to produce a manipulated thread-local heap variable, wherein modifying said thread instructions comprises randomly or pseudorandomly rescheduling by reordering said thread instructions, and inserting synchronizing instructions in said one thread, wherein an execution of said synchronizing instructions forces said manipulated thread-local heap variable to be copied to said global variable to thereby establish a synchronized global variable, and wherein an access of said synchronized global variable by an execution of another thread defines an interleaving between said one thread with said other thread; and
executing said modified thread and at least said other thread of said computer program to expose a concurrent flaw in operation of said computer program.

2. The method according to claim 1, further comprising preparing additional versions of said original computer program having respective modified threads, by iterating said steps of duplicating said global variable, and modifying said thread instructions; and iterating said step of executing said modified thread using said respective modified threads of said additional versions as said modified thread.

3. The method according to claim 1, wherein modifying said thread instructions of said one thread further comprises manipulating portions of said thread instructions to reference said duplicated thread-local heap variable according to requirements of said memory model.

4. The method according to claim 1, wherein said memory model is a one-layer memory model.

5. The method according to claim 1, wherein said memory model is a two-layer memory model.

6. A computer software product for computer program verification, including a computer-readable storage medium in which instructions are stored, which instructions, when executed by a computer, cause the computer to perform the steps of:

accepting an original computer program that executes as a plurality of threads under a memory model that includes a global heap having a global variable, said threads comprising respective thread instructions, thread-local heaps, said thread-local heaps having thread-local heap variables;

duplicating said global variable as a duplicated thread-local heap variable of said thread-local heap of one of said threads;

modifying said thread instructions of said one thread to define a modified thread such that an execution of said modified thread instructions manipulates said duplicated thread-local heap variable to produce a manipulated thread-local heap variable, wherein modifying said thread instructions comprises randomly or pseudorandomly rescheduling by reordering said thread instructions, and inserting synchronizing instructions in said one thread, wherein an execution of said synchronizing instructions forces said manipulated thread-local heap variable to be copied to said global variable to thereby establish a synchronized global variable, and wherein an access of said synchronized global variable by an execution of another thread defines an interleaving between said one thread with said other thread; and outputting said modified thread and at least said other thread to an execution engine for execution thereof to expose a concurrent flaw in said computer program.

7. The computer software product according to claim 6, further comprising preparing additional versions of said original computer program having respective modified threads, by iterating said steps of duplicating said global variable, and modifying said thread instructions; and iterating said step of outputting said modified thread using said respective modified threads of said additional versions as said modified thread.

8. The computer software product according to claim 6, wherein modifying said thread instructions of said one thread further comprises manipulating portions of said thread instructions to reference said duplicated thread-local heap variable according to requirements of said memory model.

9. The computer software product according to claim 6, wherein said memory model is a one-layer memory model.

10. The computer software product according to claim 6, wherein said memory model is a two-layer memory model.

11. A system for testing a concurrently operating computer program comprising:

a processor executing a verification program organized as distinct program modules, said program modules including:

a test generator; and an execution engine, wherein said test generator is operative for accepting an original computer program that executes as a plurality of threads under a memory model that includes a global heap having a global variable, said threads comprising respective thread instructions, thread-local heaps, said thread-local heaps having thread-local heap variables;

duplicating said global variable as a duplicated thread-local heap variable of said thread-local heap of one of said threads;

modifying said thread instructions of said one thread to define a modified thread such that an execution of said modified thread instructions manipulates said duplicated thread-local heap variable to produce a manipulated thread-local heap variable, wherein modifying said thread instructions comprises randomly or pseudorandomly rescheduling by reordering said thread instructions, and inserting synchronizing instructions in said one thread, wherein an execution of said synchronizing instructions forces said manipulated thread-local heap variable to be copied to said global variable to thereby establish a synchronized global variable, and wherein an access of said synchronized global variable by an execution of another thread defines an interleaving between said one thread with said other thread; and said execution engine is operative for executing said modified thread and at least said other thread of said computer program to expose a concurrent flaw in said computer program.

12. The system according to claim 11, wherein said test generator is operative for further comprising preparing additional versions of said original computer program having respective modified threads, by iterating said steps of duplicating said global variable, and modifying said thread instructions; and said execution engine is operative for iterating said step of executing said modified thread using said respective modified threads of said additional versions as said modified thread.

13. The system according to claim 11, wherein modifying said thread instructions of said one thread further comprises manipulating portions of said thread instructions to reference said duplicated thread-local heap variable according to requirements of said memory model.

14. The system according to claim 11, wherein said memory model is a one-layer memory model.

15. The system according to claim 11, wherein said memory model is a two-layer memory model.

* * * * *